(12) United States Patent
Matsumoto

(10) Patent No.: US 11,487,075 B2
(45) Date of Patent: Nov. 1, 2022

(54) LENS APPARATUS AND IMAGING APPARATUS

(71) Applicant: CANON KABUSHIKI KAISHA, Tokyo (JP)

(72) Inventor: Toru Matsumoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 560 days.

(21) Appl. No.: 16/550,687

(22) Filed: Aug. 26, 2019

(65) Prior Publication Data

US 2020/0073081 A1  Mar. 5, 2020

(30) Foreign Application Priority Data

Sep. 4, 2018 (JP) .............................. JP2018-164971

(51) Int. Cl.
*G02B 7/09* (2021.01)
*H02N 2/00* (2006.01)
*G03B 13/36* (2021.01)

(52) U.S. Cl.
CPC .............. *G02B 7/09* (2013.01); *G03B 13/36* (2013.01); *H02N 2/001* (2013.01); *H02N 2/0085* (2013.01)

(58) Field of Classification Search
CPC . G02B 7/09; G02B 7/28; G03B 13/36; G03B 17/12; G03B 2205/0061; G03B 3/10; H02N 2/001; H02N 2/0085
See application file for complete search history.

(56) References Cited

U.S. PATENT DOCUMENTS

| 5,264,966 A | 11/1993 | Okada |
| 7,684,137 B2 | 3/2010 | Yamazaki |
| 2015/0092282 A1* | 4/2015 | Niiyama .................. G03B 5/00 359/700 |

FOREIGN PATENT DOCUMENTS

| JP | H0511167 A | 1/1993 | |
| JP | 2960230 B2 | 10/1999 | |
| JP | 2009217236 A | 9/2009 | |
| JP | 2011123432 A | 6/2011 | |
| KR | 20140135154 A * | 11/2014 | ............... G02B 7/09 |

* cited by examiner

*Primary Examiner* — Mustak Choudhury
(74) *Attorney, Agent, or Firm* — Rossi, Kimms & McDowell LLP

(57) ABSTRACT

A lens apparatus includes a base barrel, a lens movable to an object side and an image side relative to the base barrel, an actuator configured to move the lens, a drive board that includes an electric element configured to drive the actuator, and a board holding member configured to hold the drive board and attached to the base barrel from the object side.

13 Claims, 4 Drawing Sheets

LENS APPARATUS AND IMAGING APPARATUS

BACKGROUND OF THE INVENTION

Field of the Invention

The present invention relates to a lens apparatus used for an imaging apparatus, such as a digital camera.

Description of the Related Art

As the sensitivity of an image sensor becomes higher, the imaging apparatus becomes more likely influenced by the magnetic noises generated from an actuator or a driving circuit provided in a lens apparatus. Thus, a reduction of the magnetic noises which reach the image sensor are demanded.

Japanese Patent Application Laid-Open No. ("JP") 2011-123432 discloses a lens apparatus that includes two actuators disposed parallel to two adjacent sides of four sides of an image sensor in the optical axis direction. JP 2011-123432 discloses a method of reducing the magnetic noise reaching the image sensor by reversing the electrification direction in the coils in the two actuators and the polarity of the magnet.

JP 2009-217236 discloses a lens apparatus that reduces the noise reaching a drive board by arranging a motor configured to move a movable barrel and the drive board configured to drive the motor parallel to a rotation axis of the motor.

It is however difficult to apply the configuration disclosed in JP 2011-123432 to a lens apparatus that does not have two actuators. In addition, JP 2009-217236 does not disclose a method for reducing the influence of the magnetic noise generated from the drive board on the image sensor.

SUMMARY OF THE INVENTION

The present invention provides a lens apparatus and an imaging apparatus, each of which can reduce a magnetic noise reaching an image sensor from a drive board.

A lens apparatus according to one aspect of the present invention includes a base barrel, a lens movable to an object side and an image side relative to the base barrel, an actuator configured to move the lens, a drive board that includes an electric element configured to drive the actuator, and a board holding member configured to hold the drive board and attached to the base barrel from the object side.

An imaging apparatus according to another aspect of the present invention includes the above lens apparatus, and an image sensor configured to photoelectrically convert light passing through the lens apparatus.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
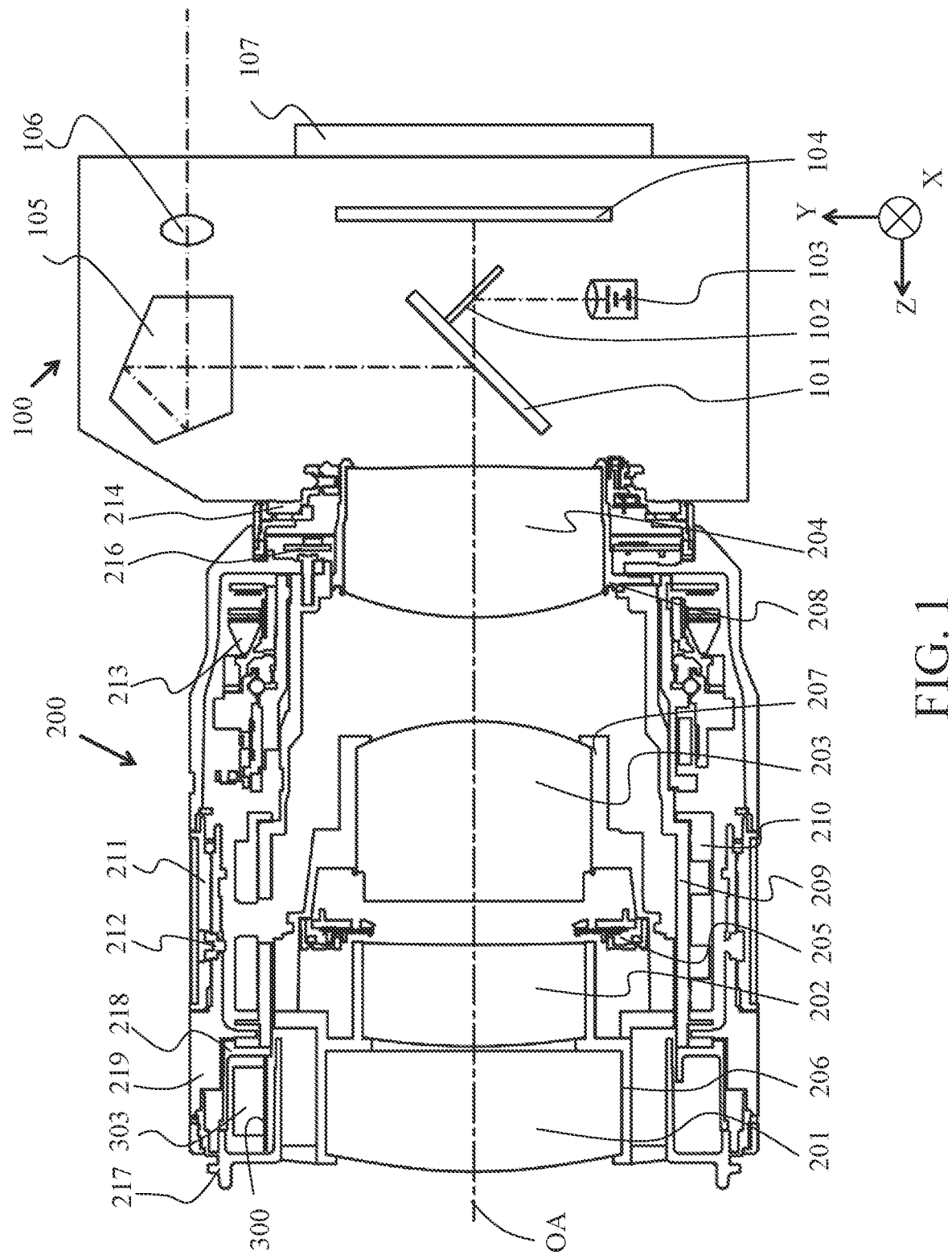
FIG. 1 is a sectional view showing configurations of a lens barrel and a camera according to a first embodiment of the present invention.

FIG. 1 illustrates configurations of an interchangeable lens 200 as a lens apparatus according to a first embodiment of the present invention, and a camera body 100 as a lens interchangeable type imaging apparatus to which the interchangeable lens 200 is detachably attached. In FIG. 1, an optical axis direction in which an optical axis OA of the interchangeable lens 200 extends is set to a Z direction, and a horizontal direction and a vertical direction of two directions parallel to an imaging plane of an image sensor 104 are set to an X direction and a Y direction. The left side of the figure on which an object is located in the optical axis direction is called an object side, and the opposite side is called an image side.

In the camera body 100, a main mirror 101 is configured to move in and out of an optical path of a light flux from the interchangeable lens 200. The main mirror 101 disposed in the optical path reflects part of the light flux toward a viewfinder optical system (105, 106), and transmits the remaining light flux. A sub mirror 102 is provided behind (on the image side of) the main mirror 101, and configured to move in and out of the optical path with the main mirror 101. The sub mirror 102 disposed in the optical path reflects the light flux that has transmitted through the main mirror 101, and introduces it to a focus detection unit 103. The focus detection unit 103 performs a focus detection by the phase difference detection method (or detects the focus state of the lens apparatus 200).

The image sensor 104 includes a CCD sensor or a CMOS sensor, and forms an object image (optical image) on the imaging plane using the light flux that has passed through the interchangeable lens 200. The image sensor 104 photoelectrically converts (captures) an object image and outputs an imaging signal.

A display panel 107 as a display unit displays image data generated by an unillustrated signal processor using the imaging signal from the image sensor 104 and other various imaging information.

The camera body 100 according to this embodiment includes a single-lens reflex camera having the main mirror 101 and the sub mirror 102, but the embodiment of the present invention is applicable to an imaging apparatus such as a mirrorless (non-reflex) camera having none of them. Instead of the focus detection unit 103, the focus detection using the imaging plane phase difference detection method may be performed using focus detection pixels provided in the image sensor 104. The focus detection may be performed by a contrast detection method using the imaging signal obtained from the image sensor 104.

The interchangeable lens 200 can move the movable lens in the optical axis direction (to the object side and the image side) through a relative rotation between a guide barrel 209 and a cam barrel 210, which will be described later. The interchangeable lens 200 holds an imaging optical system that includes a first lens unit 201, a second lens unit 202, a diaphragm (aperture stop) unit 205, a third lens unit 203, and a fourth lens unit 204.

The first and second lens units 201 and 202 are held by a first lens holding frame 206, and movable in the optical axis direction with the first lens holding frame 206. The third lens unit 203 is held by a second lens holding frame 207, and movable in the optical axis direction with the second lens holding frame 207. The first and second lens holding frames are screwed with each other, and integrally movable in the optical axis direction.

The fourth lens unit 204 is held by a third lens holding frame 208. The third lens holding frame 208 is screwed with the guide barrel 209. The diaphragm unit 205 is disposed on the object side of the third lens unit 203, and adjusts a light amount incident on the camera body 100. The diaphragm unit 205 and a communication board (communication circuit board, control board, control circuit board) 216 are electrically connected to each other via an unillustrated flexible printed circuit.

The guide barrel 209 as the base barrel has unillustrated linear groove portions at three regular intervals in the direction around the optical axis (referred to as the circumferential direction hereinafter) so as to guide the first and second lens holding frames 206 and 207 (first to third lens units 201 to 203) in the optical axis direction.

A cam barrel 210 is provided on the outer circumference of the guide barrel 209 rotatably in the circumferential direction relative to the guide barrel 209. The cam barrel 210 has unillustrated three cam groove portions at regular intervals in the circumferential direction so as to drive the first and second lens holding frames 206 and 207 in the optical axis direction. The first and second lens holding frames 206 and 207 have cam followers (not shown) engaged with the cam groove portions and the linear groove portions in the guide barrel 209. Hence, as the cam barrel 210 rotates in the circumferential direction, the first and second lens holding frames 206 and 207 (first to third lens units 201 to 203) are moved in the optical axis direction by the cam action of the cam groove portion and the guide action of the linear groove portions.

A focus operation ring 211 is rotatably held in the circumferential direction at a fixed position in the optical axis direction by the holding member 212. The holding member 212 is fixed to a focus fixing barrel 219 by press fitting of a protrusion into a hole in the focus fixing barrel 219.

A focus motor unit 213 as an actuator is a vibration type motor. A vibration type motor includes a stator as a vibrator that provides a vibration excited by a deformation of a piezoelectric element to which a periodic signal (pulsed signal) is applied, and a rotor as a contact member that contacts the stator and rotates (rotating relative to the stator). A drive board (drive circuit board) 300 is a substrate mounted with an electric element that drives the focus motor unit 213, and has an electric circuit configured to supply the periodic signal to the piezoelectric element in the focus motor unit 213 in accordance with a control signal from the communication board 216. In other words, the electric circuit on the drive board 300 drives the focus motor unit 213.

An output key (not shown) integrally rotating with the rotor in the focus motor unit 213 is engaged with the cam barrel 210, and when the rotor rotates, the cam barrel 210 also rotates. Thereby, as described above, the first to third lens units 201 to 203 move in the optical axis direction and provide focusing.

When the focus operation ring 211 is rotated by the user, a rotational amount of the focus operation ring 211 is detected by a rotation sensor that includes an unillustrated scale and photo-interrupter, and the focus motor unit 213 is driven based on the rotational amount.

The interchangeable lens 200 is mounted on the camera body 100 through a bayonet mechanism provided on a mount 214. The communication board 216 communicates with the camera body 100 via an unillustrated communication terminal provided on the mount 214. When receiving the focus drive command from the camera body 100, the communication board 216 transmits the control signal described above to the electric circuit on the drive board 300.

Figure 2:
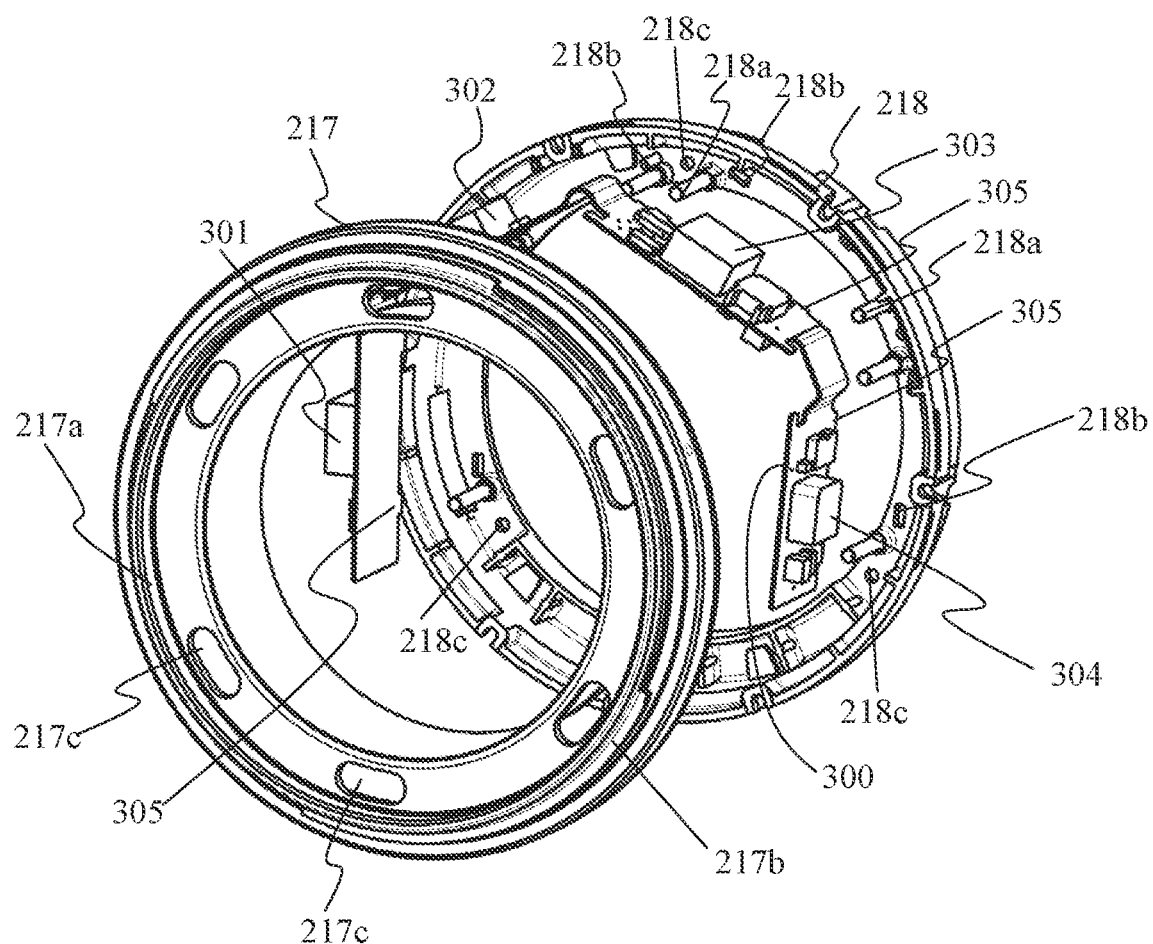
FIG. 2 is an exploded perspective view of a drive board holder according to the first embodiment.

Referring now to FIG. 2, a description will be given of a holding structure of the drive board 300. The drive board 300 includes a plurality of rigid (slightly flexible) substrates and a flexible substrate electrically connecting the plurality of rigid substrates to each other, and each rigid substrate includes the electric element that drives the focus motor unit 213. The electric element includes drive coils 301 and 302, a power supply coil 303, a filter coil 304, and a control IC for controlling the energization to each drive coil.

The power output from the communication board 216 is amplified through the power supply coil 303 and the filter coil 304, and is supplied to the control IC mounted on the drive board 300. The control IC mounted on the drive board 300 supplies the pulsed signal to the drive coils 301 and 302 when receiving the drive command signal transmitted from the communication board 216. Each drive coil converts the input pulse signal into a drive signal and supplies the drive signal to the piezoelectric element of the focus motor unit 213 to drive the focus motor unit 213.

A filter screw portion (filter attachment portion) 217a is provided on an inner circumferential portion on the object side of a filter frame 217 as a first holding member. An unillustrated optical filter can be attached to a filter screw portion 217a. A plurality of bayonet claws (hood attachment portions) 217b for attaching an unillustrated hood are provided on the outer circumferential portion of the filter frame 217 on the object side.

A board holding frame (circuit board holding member) 218 as a second holding member is disposed on the image side of the filter frame 217. The board holding frame 218 has a plurality of pins 218a for supporting the drive board 300. The projection 305 provided on the drive board 300 is engaged with a hole 218b in the board holding frame 218 to restrict a movement of the drive board 300 in the circumferential direction. The drive board 300 is held while restricted to move in the optical axis direction, because it is sandwiched between the filter frame 217 and the board holding frame 218 from the object side and the image side and the filter frame 217 and the board holding frame 218 are coupled by unillustrated screws. The filter frame 217 and the board holding frame 218 constitute a board holding member.

Figure 3:
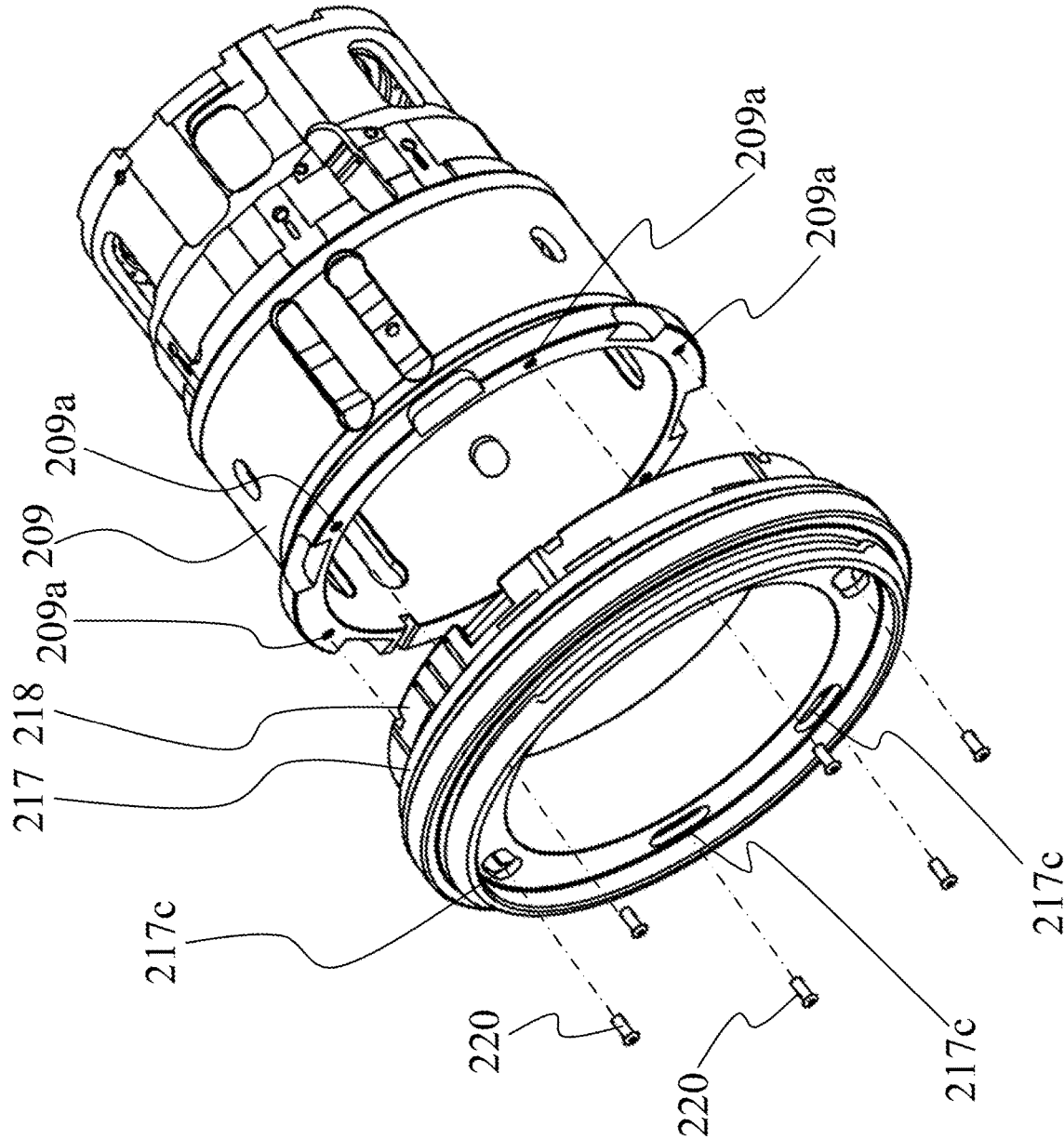
FIG. 3 is an exploded perspective view of the lens barrel according to the first embodiment.

The filter frame 217 and the board holding frame 218 which hold the drive board 300 and thus are coupled to each other are attached from the object side to the end of the guide barrel 209 on the object side, as illustrated in FIG. 3. More specifically, screws 220 are inserted into a plurality of holes 218c provided in the board holding frame 218 through a plurality of openings 217c provided in the filter frame 217. The screws 220 are put on in screw holes 209a provided in the guide barrel 209. Thereby, the board holding frame 218 is attached to the guide barrel 209 from the object side with the filter frame 217 coupled to the board holding frame 218.

A description will be given of a relationship between the magnetic noise generated from the drive board 300 in the thus-configured interchangeable lens 200 and the image sensor 104. Since the magnitude of the magnetic noise is generally in inverse proportion to the cube of the distance from the origin, as the drive board 300 that serves as the magnetic noise origin is separated from the image sensor 104, the influence of the magnetic noise on the imaging signal (or the image data) from the image sensor 104 is reduced.

The magnetic noise origin according to this embodiment contains the drive board 300, in particular, the drive coils 301 and 302, the power supply coil 303, and the filter coil 304. This embodiment separates the drive board 300 from the communication board 216 disposed on the image side of the drive board 300. The drive board 300 is not disposed on the outer circumference of the guide barrel 209, is held between the filter frame 217 and the board holding frame 218, and is disposed on the object side of the guide barrel 209 after the board holding frame 218 is attached to the guide barrel 209 from the object side. Thereby, the drive coils 301 and 302, the power supply coil 303, and the filter coil 304 are arranged at the most distant position from the image sensor 104 in the interchangeable lens 200 without increasing the outer diameter of the interchangeable lens 200. This configuration can provide a compact interchangeable lens advantageous to the reduction of the magnetic noise reaching the image sensor 104.

In this embodiment, the drive board 300 includes a plurality of rigid substrates each serving as a mounting portion of an electric element. Hence, the drive board 300 can be disposed in the circumferential direction. As a result, the interchangeable lens 200 can house the drive board 300 without increasing its outer diameter.

Figure 4:
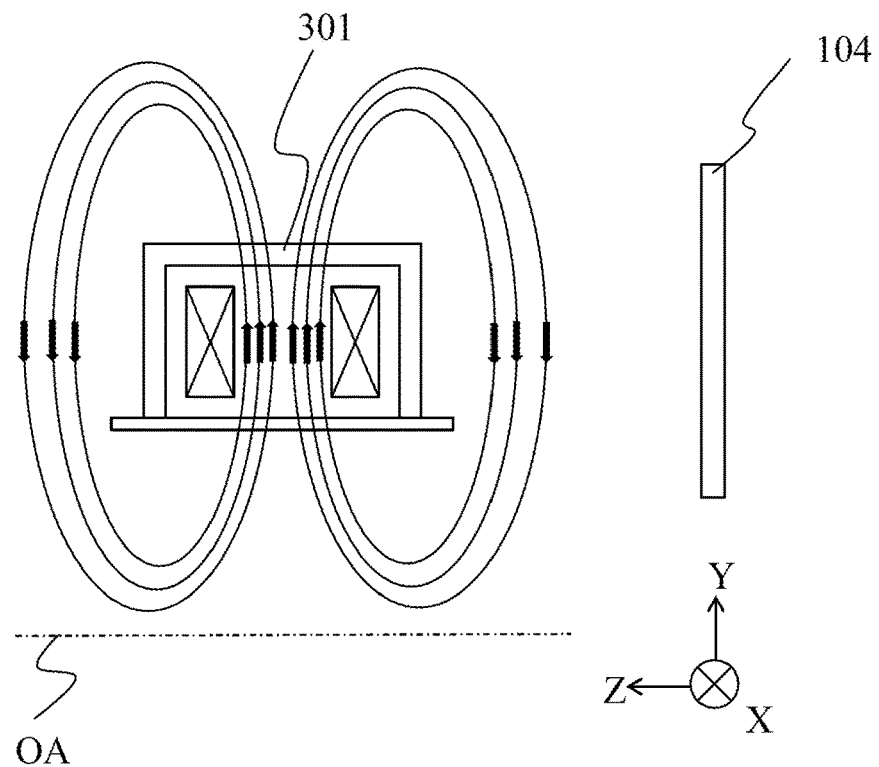
FIG. 4 illustrates a relationship between the magnetic noise emitted from the drive coil and the optical axis according to the first embodiment.

FIG. 4 schematically illustrates the magnetic noise generated from the drive coil 301 in this embodiment. In the drive coil 301, a lead wire is wound around the Y axis in FIG. 4 (around an axis orthogonal to the optical axis OA). The drive coil 302, the power supply coil 303, and the filter coil 304 are configured in the same manner as the drive coil 301.

As illustrated in FIG. 4, the drive coil 301 is likely to radiate the magnetic noise in the direction in which the Y axis extends. Thus, as described above, by winding the lead wire of the drive coil 301 around the Y axis, the magnetic noise reaching the image sensor 104 disposed in the optical axis direction is reduced relative to the drive coil 301.

Second Embodiment

Figure 5:
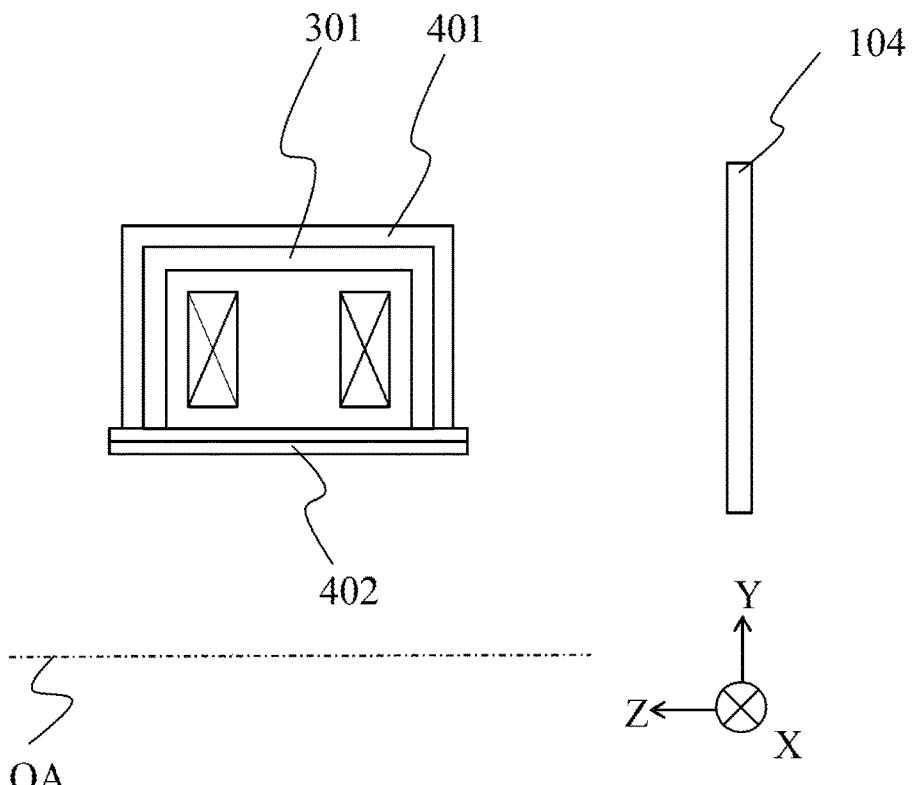
FIG. 5 illustrates a relationship between a drive coil and a magnetic shield according to a second embodiment.

Referring now to FIG. 5, a description will be given of a second embodiment according to the present invention. This embodiment will describe a configuration for further restraining the magnetic noise from reaching the image sensor 104 than the first embodiment. In this embodiment, the components common to those in the first embodiment will be designated by the same reference numerals as those in the first embodiment, and a description thereof will be omitted.

As illustrated in FIG. 5, this embodiment arranges a first magnetic shielding member 401 and a second magnetic shielding member 402 so as to cover the drive coil 301. The first and second magnetic shielding members are provided for the other drive coil 302, the power supply coil 303, and the filter coil 304. The first and second magnetic shielding members 401 and 402 are made of a material, such as copper, that can provide a magnetic shielding effect.

With such a configuration, even when the overall length of the interchangeable lens 200 is short and the distance from the image sensor 104 to the drive coil 301 cannot be sufficiently secured, the magnetic shielding effect of each magnetic shielding member restrains the magnetic noise from the drive coil 301 from reaching the image sensor 104.

This embodiment arranges two magnetic shielding members to cover the drive coil, but may use only one magnetic shielding member. The magnetic shielding member may be disposed at least on the image side of the drive coil.

Where this embodiment discusses two electric circuit boards or the drive board 300 and the communication board 216, the communication board may be omitted.

Each of the above embodiments has described an interchangeable lens as the lens apparatus, but the other embodiment of the present invention covers a lens barrel (lens apparatus) used for a lens integrated imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164971, filed on Sep. 4, 2018, which is hereby incorporated by reference herein in its entirety.

What is claimed is:

1. A lens apparatus comprising:
a base barrel;
a lens movable along an optical axis of the lens;
an actuator configured to move the lens to an object side and an image side;
a drive board that includes an electric element configured to drive the actuator; and
a board holding member configured to hold the drive board and attached to an object side end of the base barrel, the object side end being located on the object side further than the actuator.

2. The lens apparatus according to claim 1, wherein the drive board is held by the board holding member so as to extend in a circumferential direction of the base barrel.

3. The lens apparatus according to claim 1, further comprising a cam barrel rotatable relative to the base barrel and including a cam configured to move the lens to the object side and the image side,
wherein the actuator rotates the cam barrel.

4. The lens apparatus according to claim 1,
wherein the board holding member includes a first holding member disposed on the object side, and a second holding member disposed on the image side, and
wherein the second holding member is attached to the base barrel.

5. The lens apparatus according to claim 4, wherein the first holding member includes a filter attachment portion to which an optical filter is attachable.

6. The lens apparatus according to claim 4, wherein the first holding member has a hood attachment portion to which a hood is attachable.

7. The lens apparatus according to claim 1, wherein the actuator is a vibration type motor in which a vibrator configured to provide a vibration excited by a piezoelectric element and a contact member configured to contact the vibrator rotate relative to each other.

8. The lens apparatus according to claim 1, wherein the drive board includes a rigid substrate.

9. The lens apparatus according to claim 1, further comprising a communication board disposed on the image side of the drive board,
wherein an electric circuit provided on the drive board drives the actuator in response to a signal from the communication board.

10. An imaging apparatus comprising:
a lens apparatus; and
an image sensor configured to photoelectrically convert light passing through the lens apparatus,
wherein the lens apparatus includes:
a base barrel;
a lens movable along an optical axis of the lens;
an actuator configured to move the lens to an object side and an image side;
a drive board that includes an electric element configured to drive the actuator; and
a board holding member configured to hold the drive board and attached to an object side end of the base barrel, the object side end being located on the object side further than the actuator.

11. A lens apparatus comprising:
a base barrel;
a lens movable along an optical axis of the lens to an object side and an image side relative to the base barrel;
an actuator configured to move the lens to an object side and an image side;
a drive board that includes an electric element configured to drive the actuator; and
a board holding member configured to hold the drive board and attached to an object side part of the base barrel, the object side part being located on the object side further than the actuator from the object side,
wherein the electric element includes a coil in which a lead wire is wound around an axis orthogonal to the optical axis of the lens.

12. The lens apparatus according to claim 11, further comprising a magnetic shielding member provided at least on the image side of the coil.

13. An imaging apparatus comprising:
a lens apparatus; and
an image sensor configured to photoelectrically convert light passing through the lens apparatus,
wherein the lens apparatus includes:
a base barrel;
a lens movable along an optical axis of the lens;
an actuator configured to move the lens to an object side and an image side;
a drive board that includes an electric element configured to drive the actuator; and
a board holding member configured to hold the drive board and attached to an object side part of the base barrel, the object side part being located on the object side further than the actuator,
wherein the electric element includes a coil in which a lead wire is wound around an axis orthogonal to the optical axis of the lens.

* * * * *